Dec. 15, 1936.  M. H. RIX  2,064,219
VEHICLE WHEEL
Filed Feb. 18, 1933
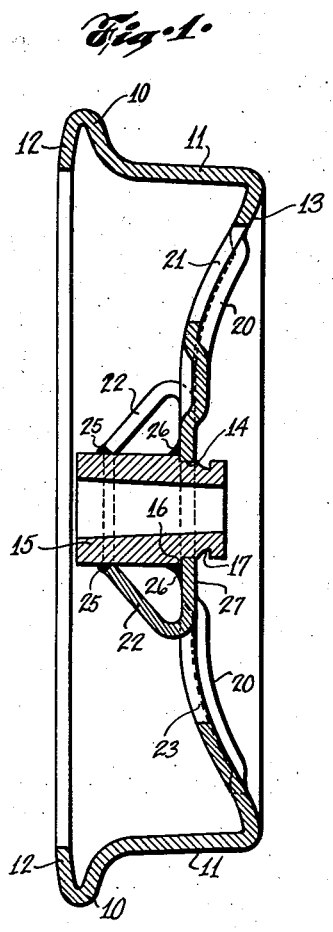
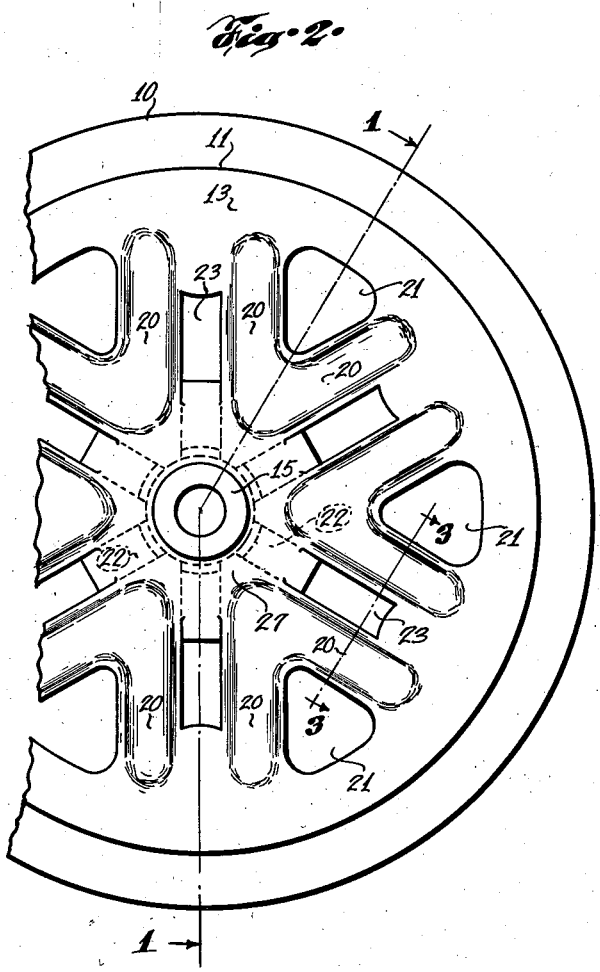
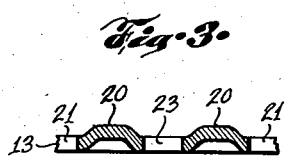
INVENTOR.
MILTON H. RIX
BY
ATTORNEY.

Patented Dec. 15, 1936

2,064,219

UNITED STATES PATENT OFFICE 2,064,219

VEHICLE WHEEL

Milton H. Rix, Three Rivers, Mich., assignor to Fairbanks, Morse & Company, Chicago, Ill., a corporation of Illinois Application February 18, 1933, Serial No. 657,383

2 Claims. (Cl. 295—24)

This invention relates to improvements in vehicle wheels, and more particularly to an improved car wheel embodying parts of pressed construction, and assembled by welding.

An object of the present invention is to produce, more economically than according to prevailing practices, a vehicle wheel characterized entirely by parts of pressed steel construction, the assembly of such parts being provided for by welding.

A further object of the invention is attained in an improved car wheel of quick detachable type, embodying a web portion which may be radially strengthened, as by corrugation, and assembled to an auxiliary hollow structure which may be so designed as to compensate for or absorb shrinkage and expansion stresses due to the heating effects of welding the wheel and hub elements into assembly.

Yet another object of the invention is attained in an improved wheel structure embodying a radially corrugated wheel web, to the corrugated portion of which may be united, as by welding, a hollow hub-positioning member, adapted as a strut or bracing structure, making for greater rigidity of the wheel.

A still further object is attained in an improved simplified and rugged wheel pulling device or tool, adapted to facilitate the removal of wheels of the type noted, from an axle or shaft on which the wheel is mounted.

The foregoing and additional objects will more fully appear from the following detailed description of a preferred embodiment of the invention, and from the drawing illustrating such embodiment, and in which:

Fig. 1 is a diametral section, and Fig. 2 a fragmentary plan view of an embodiment of the invention, Fig. 1 being taken as viewed along line 1—1 of Fig. 2, and Fig. 3 is a section as viewed along line 3—3 of Fig. 2.

Referring by characters of reference to the drawing, there is indicated at 10 the flange portion of the wheel as constructed for railroad use, the present embodiments of the invention being intended, by way of example, to illustrate its application to the construction of wheels for lighter railway rolling stock, for example as used on railway motor cars for inspection and general light haulage duty.

The tread portion of the wheel is indicated at 11, from which it will be noted that the flange 10 is constituted by a reversely bent lip extending peripherally along the inside edge of the tread, the inner element of this lip being indicated at 12. From the opposite margin of the tread, a disc-like web portion, indicated generally at 13, projects inwardly toward the axis of the wheel. By preference, for reasons of strength, appearance and car dimensions, the disc-like web portion is curved or dished inwardly so as to present a concave aspect of the outer wheel face, the web continuing this trend of inward curvature to a substantially planar central area hereinafter referred to, and provided with an axial hub-receiving aperture 14. Through this aperture extends a substantially cylindrical hub element indicated generally at 15, the major portion of the hub projecting from the web in a direction inwardly along the wheel axis. For the purpose of providing a seat for the portion of the web adjacent the opening 14, the hub 15 is characterized by a portion of slightly reduced diameter, forming a shoulder 16. It is a further preference that the hub extend in an outward direction beyond the web, and that this projecting portion be provided with an external groove 17 for the reception of the claws or pulling elements of a wheel puller, whereby to facilitate removal of the wheel incident to its replacement.

Further referring to the web portion of the wheel indicated generally at 13, it is a preference that this be formed integrally with the tread portion 11 and flange portions 10 and 12, so that the wheel need consist only of two parts, viz., that forming the web, tread and flange portions, and the element constituting the hub for securement of the wheel to the car axle, (not shown). According to the example illustrated, the web portion 13 is characterized by a plurality of outstruck portions, projecting toward the visible face of the wheel after the manner of ribs or strengthening elements, these being indicated at 20, these ribs being of generally radial trend and substantially evenly angularly spaced about the web of the wheel. It will further appear that these corrugations or stiffening portions 20 are related to each other in pairs, so as to assume a somewhat V-shaped aspect. Intervening each of these paired rib portions 20, is a triangular aperture 21, which serves to reduce the weight of the wheel proportionately to the amount of metal removed at these locations.

Intervening the adjacent projections 20 of neighboring pairs, are a plurality (shown as six) of instruck somewhat rectangular tongues 22. The areas of the web which result in the formation of these tongues when bent rearwardly, are indicated at 23. It will appear that the bracing elements or arms 22 result in a dual advantage, first in relieving, for lightness, the web portion of the wheel over the areas 23, and further in the utilization of these arms or tongues 22 as bracing or stiffening members. For the latter purpose the free ends of the elements 22 are welded to the hub 15 along a perimetral line 25 somewhat inwardly of the inner end of the hub, by preference substantially as shown.

It is a preference that the wheel structure, except for the hub, be formed by stamping or punching suitable steel stock of the requisite gauge, depending upon the service to which the wheel is to be subjected. Assembly of the two parts will have been obvious in part from the foregoing description, it having been noted that the inner ends of the arms 22 are welded to the inner end portion of the hub. It is a further preference that the web portion of the wheel be welded to the hub just inwardly of the opening 14, so as firmly to secure the web firmly adjacent the shoulder on the hub 15, this line of weld being indicated at 26.

It will have appeared from the foregoing description that a wheel formed according to the features of construction heretofore outlined, is characterized by substantial strength and rigidity, being preferably characterized by a central, substantially planar disc area indicated at 27, this portion lying in a plane close to a diametral plane intersecting the center line of the tread. It will be further noted that the concavo-convex curvature of the remaining portion of the wheel web connecting the disc 27 and the tread, serves, due in part to the outstruck ribs 20, to provide a particularly efficient and rigid structural connection between the hub and tread portions, and that the wheel in all other respects fully attains each of the objects hereinabove expressed.

I claim:

1. A two-part wheel for light railway equipment, consisting of a metal body including peripheral tread and flange portions, the flange being constituted by a reversely-bent lip extending peripherally along the inner edge of the tread, a disc-like web portion extending from the outer edge of the tread inwardly toward the axis of the wheel, and dished to present a concave aspect of the outer wheel face, the web continuing its trend of inward curvature to an axial hub-receiving aperture, a substantially cylindrical hub element extending through the aperture therefor and projecting from the web in a direction inwardly along the wheel axis, a plurality of hub-bracing arms, each formed by a radially instruck, cutout portion of the web, the said arms each being bent inwardly from the point of its connection to the web so that the outer ends engage and collectively embrace the cylindrical surface of the hub element near its innermost end, the hub being provided with a portion of slightly reduced diameter forming a shoulder near its outer end and just inwardly of the hub aperture in the web, and the hub being metallically united to the web adjacent said shoulder, and to the ends of the instruck arms.

2. A two-part wheel for light railway equipment, consisting of a pressed metal body including peripheral tread and flange portions, the flange being constituted by a reversely-bent lip extending peripherally along the inner edge of the tread, a disc-like web portion extending from the outer edge of the tread inwardly toward the axis of the wheel, and dished to present a concave aspect of the outer wheel face, the web continuing its trend of inward curvature to an axial hub-receiving aperture, a substantially cylindrical hub element of approxnmately even diameter extending through the aperture therefor and projecting from the web in a direction inwardly along the wheel axis, a plurality of hub-bracing arms, each formed by a radially instruck, cutout portion of the web, one end and the sides of which are severed from the body of the web disc and the opposite end remaining connected to the web about midway between the hub and flange, the said arms each being bent inwardly from the point of its connection to the web so that the outer ends of the arms engage and collectively embrace the cylindrical surface of the hub element near its innermost end, the hub being provided with a portion of slightly reduced diameter forming a shoulder near its outer end and just inwardly of the hub aperture in the web, and the hub being metallically united to the web adjacent said shoulder, and to the ends of the instruck arms.

MILTON H. RIX.